United States Patent [19]

Blatt

[11] 4,264,251
[45] Apr. 28, 1981

[54] BULKHEADING CONSTRUCTION

[75] Inventor: David H. Blatt, Elkins Park, Pa.

[73] Assignee: Walnut Industries, Inc., Philadelphia, Pa.

[21] Appl. No.: 912,458

[22] Filed: Jun. 5, 1978

[51] Int. Cl.³ .............................................. B60P 7/00
[52] U.S. Cl. .................................... 410/100; 410/103
[58] Field of Search ............. 105/467, 468, 469, 471, 105/472, 367; 206/391, 393, 597, 451, 452; 280/179 A; 410/103, 100

[56] References Cited

U.S. PATENT DOCUMENTS

| | | | |
|---|---|---|---|
| 3,547,457 | 12/1970 | Langer | 206/597 |
| 3,848,889 | 11/1974 | Sharrow | 280/179 A |
| 3,910,558 | 10/1975 | Brucker et al. | 280/179 A |
| 4,111,132 | 9/1978 | Plut | 280/179 A |

Primary Examiner—Richard A. Bertsch
Attorney, Agent, or Firm—Edelson and Udell

[57] ABSTRACT

A load-retaining barrier construction formed exclusively of high tensile strength plastic sheet material having a limited stretch capability precut to length sufficient to provide the same with portions which are fixedly secured in position at opposite sides of a load confining space and with freely extending end portions which are adhesively secured together in overlapped relation, said overlapped part of the barrier being wrapped or turned upon itself about an axis extending across the width of the barrier material in the region of said overlap through a number of turns sufficient to tension the barrier to the degree desired. This tensioning is effected by a turning tool applied to the overlapped part of the barrier along said axis. Upon tensioning the barrier to its desired degree, a covering strip or blanket formed of the barrier sheet material is then adhesively secured in overlying relation to the exposed surfaces of said turned part as well as to portions of the barrier contiguous to opposite sides of said part for holding said tensioned contiguous portions secure against shear forces tending to pull the same apart.

22 Claims, 15 Drawing Figures

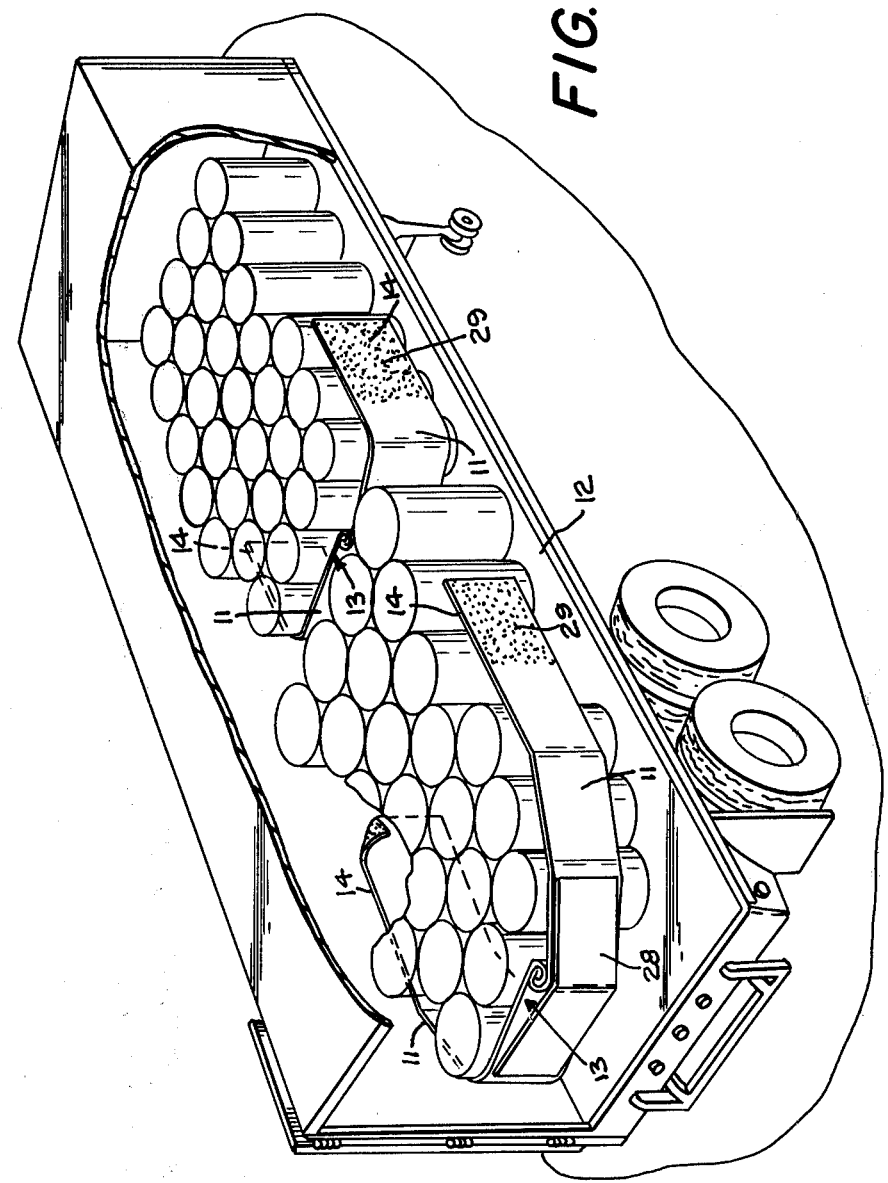

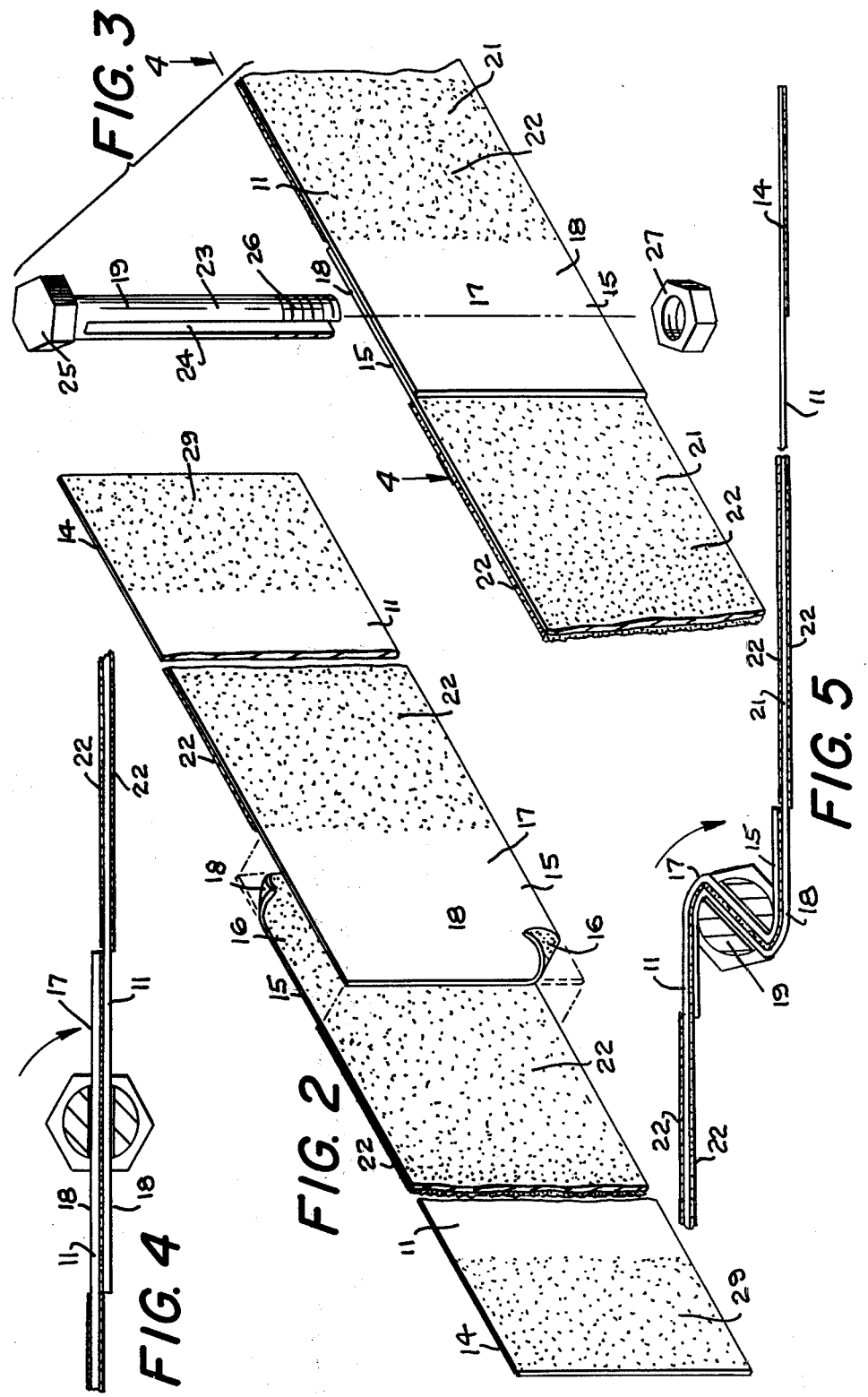

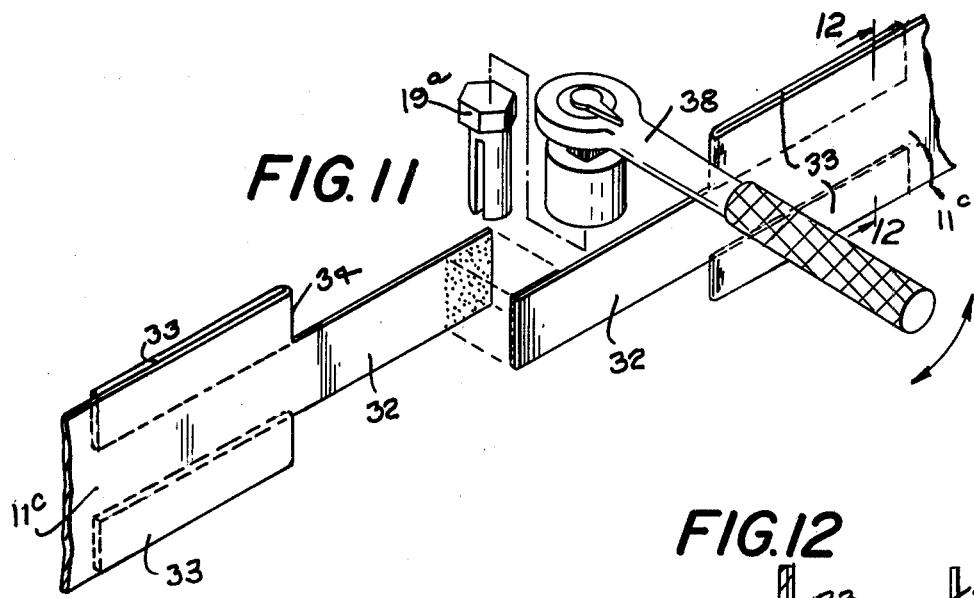
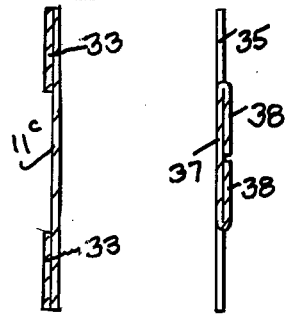
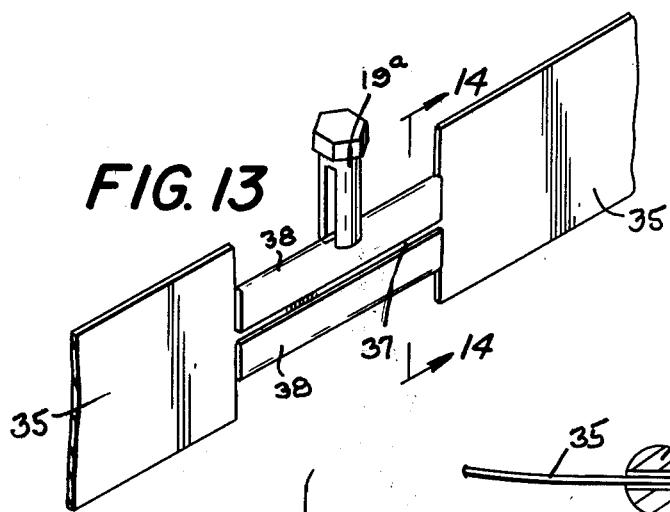
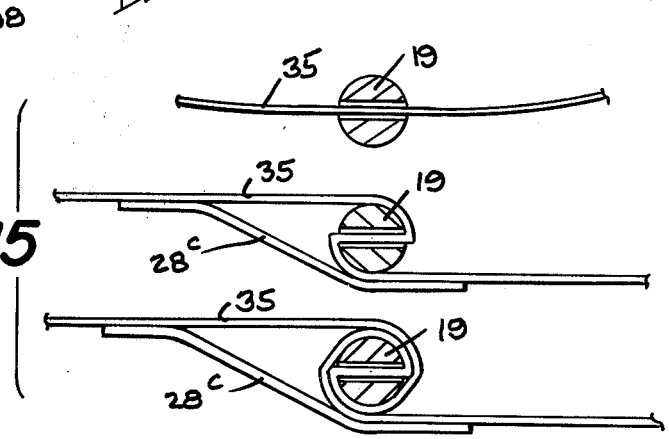

BULKHEADING CONSTRUCTION

This invention relates generally to bulkheading materials and more particularly to improvements in the construction and method of application of self-reinforced sheet material panels for use as load-confining barriers in railroad box cars, trucks and like carriers.

Among the principal objects of the present invention is the utilization in the construction and installation of load restraining barriers and the like of relatively flexible sheet material panels of high tensile strength which have a modulus of elasticity enabling the same to be linearly stretched without break or loss of tensile to absorb and cushion the shock of a load force suddenly applied thereagainst.

A further object is to provide a load confining barrier formed of sheet material having the aforesaid properties which may be tensioned to the desired degree about the load or along a required load line to provide a quickly erectable bulk heading partition for preventing shifting of a load in the carrier body or for segregating in said body one or more separate loads contained therein.

Still another important object of the present invention is to provide a bulkheading construction formed of linearly stretchable high tensile strength sheet material having overlapping end portions thereof adhesively secured together in a region thereof which may be convoluted through a plurality of turns to provide a load-restraining or load-confining unit which is tensioned about the load or along a prescribed load line to a degree sufficient to resiliently absorb the shock of a shifting load.

More specifically, it is among the objects of the present invention to provide a bulkheading or barrier construction consisting of a pair of panels which have their remote end portions adhesively secured to spaced-apart wall surfaces of the carrier body, and their corresponding inner portions adhesively secured together in overlapping relation to provide a tensionable barrier extending along a prescribed load line, e.g., about a given load to confine the same in a desired area or along a line for closing the door frame openings such as are conventionally present in railroad box cars and trucks.

Still another object is to provide a novel construction of a bulkheading or barrier unit for confining in position within a transport vehicle or for unitizing a load for pallet handling thereof which is formed entirely and exclusively of such high strength and linearly stretchable sheet material panelling so that when adhesively secured in place about the load and tensioned in accord with the present invention the panelling in and of itself serves effectively to cushion and bear the full weight of the load.

Having in mind the foregoing, the present invention contemplates the provision of a tensionable bulkhead or barrier of such construction as enables it to be adhesively secured in position and tensioned along a prescribed load line without destroying, damaging or otherwise deleteriously affecting the load-receiving compartment of the transport vehicle, such as results from the use of nails or other devices for securing the barrier in place.

Other objects and advantages of the present invention will be apparent from the detailed specification which follows, it being understood that this invention consists in the combination, construction, location and relative arrangement of parts as hereinafter described, as shown in the accompanying drawings and as finally pointed out in the appended claims.

In the accompanying drawings:

FIG. 1 is a perspective view showing the interior of a mobile carrier, e.g. a truck body, in which is illustrated the installation and use of the bulk-loading barrier constructed in accordance with and embodying the principles of the present invention;

FIG. 2 is a perspective view showing a pair of the barrier panels pre-cut to length and the areas of their surfaces which are coated with adhesive for securing said panels together in overlapped tensioned condition;

FIG. 3 is a fragmentary perspective view showing the inner overlapped portions of the bulk-heading panels adhesively secured together and showing also a device for coiling up said overlapped portions of said barrier panels and contiguous extensions thereof after the outer ends of the same have been adhesively secured in place to thereby tension the barrier along its load line;

FIG. 4 is a top edge view of the tensioned central portion of the barrier assembly as viewed along the line 4—4 of FIG. 3;

FIG. 5 is a top edge view of the barrier assembly similar to FIG. 4 but showing the inner adhesively secured portions of the overlapped panels partially coiled into barrier-tensioning formation;

FIG. 11 is an exploded isometric view showing a modified construction of the panels forming the panelling of the present invention;

FIG. 12 is a sectional view taken on the line 12—12 of FIG. 11;

FIG. 13 is a perspective view showing a further modification of the invention;

FIG. 14 is a sectional view taken on the line 14—14 of FIG. 13; and

FIG. 15 are diagrammatic views illustrating the tensioning of the panelling formed of a continuous length of the barrier sheet material.

Figure 6:
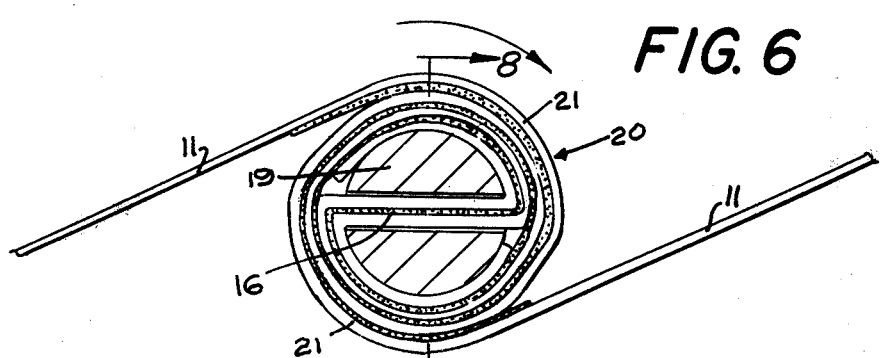
FIG. 6 is a top edge view of the barrier assembly showing the central portion thereof completely wound up into its coiled formation with the outer convolutions thereof adhesively secured together for tensioning the bulk-heading barrier into its final tensioned condition.

As has been indicated in the foregoing statement of objects, the load-confining barrier of the present invention is basically formed of any suitable relatively flexible high-strength sheet material having a modulus of elasticity which enables it to be linearly stretched sufficiently without break or loss of strength to resiliently absorb and cushion the shock of a load force suddenly applied against the surface of the barrier. Among the commercially available materials having the aforesaid physical properties are plastic sheet materials, such as those consisting of spun bonded olefin produced in sheet form of high-density polyethylene fibres, an example of which is "Tyvek" manufactured and sold by E. I. DuPont DeNemours & Co., Inc. We have found that any such sheet material having a stretch capacity of from 18 to 20 percent of its relaxed length without any reduction in its tensile strength is suitable for use as a bulk-heading webbing which may be tensioned along the load-confining line in accordance with the present invention.

The sheet material or webbing of which the bulk-heading barrier is formed, is preferably obtained or produced in rolls (not shown) of any convenient length, preferably in uniform widths of 24, 36 and 48 inches, from which in one form of the invention, sections may be cut into suitable lengths to provide a pair of panels 11—11 which, as illustrated in FIGS. 1 to 9, conjointly form the load-confining barrier of the present invention which extends along the load line and holds in position against shifting a load of containers or packages of goods contained within the body 12 of a carrier, such as a truck or a railway box car. FIG. 1 illustrates the installation in a single carrier of two such load barriers, each generally designated 13, for respectively holding in position two separate loads of the goods being transported.

Each such barrier 13 is formed of a pair of the panels 11—11 cut from a roll of the aforesaid stretchable sheet material to approximately equal lengths sufficient to respectively provide the same with outer end portions 14—14 adapted to be adhesively secured to the interior surfaces of the side walls of the load-carrying vehicle and with inner end portions 15—15 adapted to be adhesively secured together in overlapping relation approximately in the region centered between the secured-in-position remote ends of the barrier. The two panels 11—11 which make up each load barrier will of course be cut to whatever lengths are required to provide when combined a complete barrier of an overall length adequate in its tensioned condition, as shown in FIG. 1, to extend along the load line in confining relation about the load to be held secured in position. Thus, it will be noted that the barriers 13—13 shown in FIG. 1 are of different overall lengths because of the different expanses of the loads about which the barriers extend.

It will be noted that when the outer or remote ends of the barrier-forming panels 11—11 are adhesively secured in place and their inner end portions are overlapped and joined together by an interfacial film of adhesive applied as at 16—16 to the facing surfaces of the panels 11—11 over the overlapped area 17 thereof, the outer surfaces 18—18 of said overlapped area are kept completely free of any adhesive. Thus, when a tensioning device, such as the kerfed tool 19 shown in FIG. 3, is axially slipped transversely across the width of the overlapped, adhesively secured area centrally between the opposite endwise boundaries thereof, and along a line extending normal to the length of the barrier, as see FIGS. 4 and 5, depending upon the longitudinal extent of the adhesively secured area, the turning tool 19 may be rotated one or more full turns about its longitudinal axis without itself being adhesively secured to the barrier material.

Such rotation of the tool 19 causes the overlapped ends of the barrier panel 11—11 to be wound into a coiled configuration 20 for tensioning to the desired degree the bulk-heading barrier 13 along its load line. In accordance with the present invention, rotation of the tensioning tool may be continued through as many revolutions as are required to achieve the desired degree of tension, and to this end additional portions 21—21 of the barrier which are respectively contiguous to and extend oppositely beyond the spaced-apart side boundaries of the overlapped central area 17 thereof may be wound into the tensioning coil. If desired, one or more of the encircling outer turns of the coil 20 may be so adhesively secured together as to counteract any tendency of the coil to unwind upon removal of the tensioning tool therefrom. To this end, the opposite faces of each of these extended portions 21—21 are coated, as at 22, with films of adhesive, as see FIGS. 3 to 5, so that as the tensioning tool 19 is rotated to include these adhesively coated portions 21—21 as one or more additional convolutions of the coil 20 they (the said additional convolutions) are cemented together and hold the coil 20 intact against any unwinding thereof upon removal of the tensioning tool 19 from the center of the formed barrier-tensioning coil. Such removal of the tensioning tool 19 from the coiled part of the barrier 13 is easily effected since the first turn or turns of the barrier about said tool are not adhesively secured together nor to the tool itself and so have the ability to relax sufficiently within the adhesively bonded outer turns of the coil 20 to readily permit axial withdrawal of the tool from these non-adhesively secured central turns of the coil.

The tensioning tool 19 basically consists of an elongated member 23, preferably but not necessarily of a cylindrical shape as shown, having formed therein an open-ended kerf 24 of a length sufficient to enable it to be slipped transversely across and embracingly receive in the kerf the full or a major part of the width of the overlapped portions of the barrier panels 11—11. The kerf thickness is desirably such as to snugly accomodate these portions and yet permit axial withdrawal thereof from the central non-adhesively secured turns of the coiled-up portion of the barrier upon completion of the turning effort. This turning effort is facilitated by providing the tensioning tool at its unkerfed top end with an enlarged head 25 to which a suitable turning wrench, such as a ratchet type wrench 38 shown in FIG. 11, may be applied. If desired, the free end of the kerfed tool 19 may be extended sufficiently and externally threaded, as at 26, to receive a nut 27 to which a wrench may be applied adjacent the bottom edge of the barrier for turning the tool to the extent required. It will be apparent, of course, that upon rotating the kerfed tool while it is fitted centrally over the overlapped portions of the barrier assembly with the opposite end portions of the latter fixedly secured in place, the sheet material of which said barrier is formed will be stretched into a tensioned condition sufficient to securely hold the load in place and yet resiliently absorb any shocks resulting from any shifting of the load laterally against the barrier. Preferably, the wrench employed for turning the tensioning tool 19 is of the ratched-operating type which when releasably held in any of incrementally turned positions correspondingly holds the coils in its tensioned condition until such time as the wrench and the tool to which it is applied are removed from the tensioned barrier.

Figure 7:
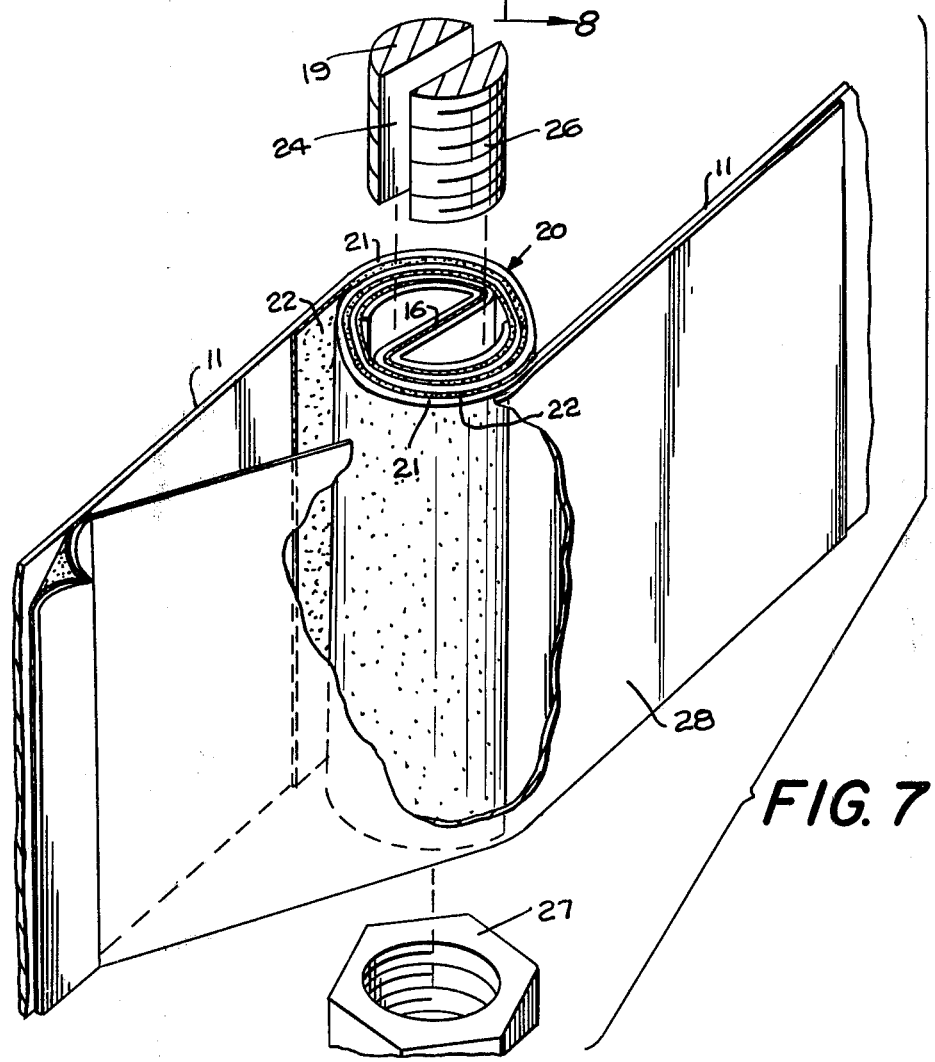
FIG. 7 is a perspective view of the tensioned bulk-heading barrier of FIG. 6 showing the application of an additional pre-cut-to-length panel of the bulk-heading or other suitable material adhesively applied over the coiled portion of the paneling to strengthen and maintain intact the integrity of said coiled portion against forces which would tend to unwind the same.
Figure 8:
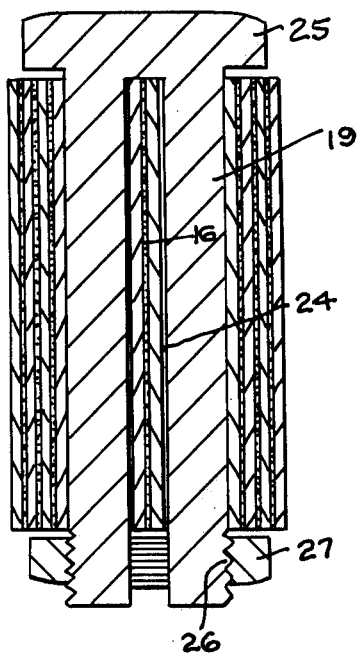
FIG. 8 is a vertical cross-section view of the coiled central portion of the bulk-heading assembly as taken along the line 8—8 of FIG. 6.

In order to permanently secure the coiled-up portion 20 of the barrier against any possibility of its unwinding or being torn apart under the oppositely directed pulling forces acting upon the tensioned barrier 13 to either side of its coiled part 20 when the barrier is subjected to the blow of a force suddenly applied thereto, such as that of a shifting load, an additional section 28 of the barrier sheet material or webbing is adhesively applied lengthwise across the central coiled-up part of the tensioned barrier, as shown, for example, in FIGS. 1 and 7. Preferably, this additional strip 28 is cut from the same roll of sheet material as that for the barrier panels 11—11 to a length sufficient to completely cover the external exposed portion of the winding 20 and the oppositely extending portions of the barrier panels 11—11 which are contiguous to the rolled-up part 20 of the barrier. Thus, the barrier panel sections which extend oppositely to either side of the coiled section 20 thereof are held in shear relation to the strip or blanket 28 adhesively secured thereto, the shear stress being confined to the interfacial bond between the panel sections 11—11 and their covering blanket 28.

Any suitable contact cement may be utilized in practicing the novel method of installation as hereinbefore described provided that it exhibits sufficient strength when subjected to shear under widely varying temperature conditions. An adhesive which has been found to be satisfactory in actual use is a synthetic rubber resin adhesive which is commercially available and well known as contact cement. This adhesive is usable and effective by brushing or roller coating the same on the selected surfaces of the panelling as described at temperatures ranging from minus 20° F. to at least 200° F. above zero. Further it has a shear strength of from two to three thousand pounds per square inch so that the panelling constructed and installed as herein described is well able to restrain a load of twenty-five thousand pounds applied against the same. Restraint forces of this nature are rarely, if ever, required in truck transport or railroad car applications so that in general a considerable safety factor is present.

The sequence of applying the adhesive to the surfaces of the tensionable sheet material which are to be adhesively secured together may of course vary as the circumstances require for installation of the tensioned barrier material. Thus, in those cases in which it is desired to employ the sheet material paneling as a tensioned load enclosing and retaining means, the two panels 11—11, which are precut to their requisite lengths to provide an overlap between their meeting inner end portions, initially have their remote end portions respectively secured to the spaced-apart wall surfaces of the load-carrying truck by adhesive liberally applied to the panels over the areas 29—29 thereof and to the corresponding areas of the truck wall surfaces to which the adhesively coated remote end portions of the barrier panels are to be secured. Strong adhesion is obtained by applying pressure against the panels preferably with a roller device or by tapping the panels with a broad-faced mallet over their full adhesively coated areas to bond the same securely to the adhesively coated surfaces of the truck wall.

Figure 9:
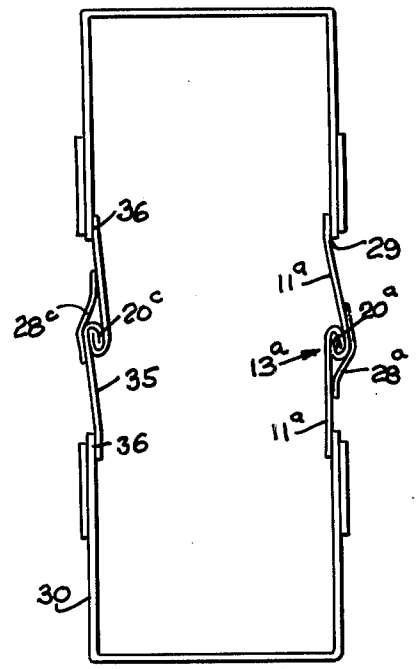
FIG. 9 is a diagrammatic over-head plan view of the body of a load carrier illustrating the application of the bulk-loading barrier material across door openings provided in the opposite side walls of the carrier.

Having so bonded the remote end portions of the barrier panels 11—11 to the side wall surfaces of the truck body, (and the load having been placed in the truck body in position to be held secured by the load barrier), the inner end portions of the panels which are to be secured together in overlapped relation are then respectively coated, as at 16—16, with adhesive on their facing surfaces, so that when the freely extending portions of the panels 11—11 are drawn more or less tautly together along the required load line, i.e. about the load to be contained thereby, as see FIG. 1, or across an open doorway, as see FIG. 9, the adhesively coated surfaces 18—18 of the panels 11—11 may be securely bonded together in overlapped relation. The outer surfaces of the barrier panels 11—11 thus interfacially bonded together in the overlapped area 17 thereof are entirely free of any adhesive as previously described.

At the same time that the adhesive is applied to the overlapped interfacial surfaces of the panels 11—11, liberal coatings of adhesive may be applied to both surfaces of each of the barrier panels 11—11 over coextensive areas thereof which are contiguous to and extend longitudinally beyond the endwise boundaries of their overlapped area 17 for a distance sufficient to provide the coiled-up part 20 of the barrier 13 with one or more full outer convolutions which are so adhesively bonded together as to prevent any such unwinding of said coiled-up part as might relieve the barrier of its desired degree of tension.

In certain instances, depending upon the degree of tensioning required and the inherent stretchability and other characteristics of the sheet material of which the barrier is formed in accord with the present invention, in order to hold the coiled-up part 20 of the barrier secure against any unwinding thereof, the portions of the barrier panels 11—11 which are contiguous to and extend oppositely beyond the outer boundaries of the overlapped area 17 of the barrier and which may form the outermost turns of the tensioning coil part 20 of the barrier may be provided with coatings 22 of adhesive on only one face thereof. However, in such instances these single face coatings of adhesive are respectively applied to the inside surface of one and the outside surface of the other of the two panels 11—11 which make up the barrier, i.e., to the oppositely disposed surface areas of the two panels which respectively extend just beyond the endwise boundaries of their overlapped area, thus insuring that the outer turns of the coil 20 are adhesively secured into the coil as a fixed unwindable part thereof.

It will be understood that where the tensioning coil 20 is held in its wound up condition by operation of the tensioning tool itself preliminarily to application of the shear strip or blanket 28 as hereinbefore described, there will be no need to adhesively bind into the coil any of its turns and thus in such instance the adhesive coatings 22 may be entirely dispensed with.

Having so tensioned the barrier along its load line, the exposed surfaces of its coiled part 20 and extensions of the panels 11—11 to either said coil are liberally coated with contact cement, as is the inner surface of the strip 28 and the latter is then applied in position as shown to completely cover the coil part 20 and hold it secure in its tensioned condition. When so cemented in position, the strip 28 is so oriented in relation to the tensioned barrier that the weight or force of the load directed thereagainst is transmitted primarily to the adhesive bond between the strip 28 and the portions of the tensioned barrier which is covered thereby as a shear force coincident with and parallel to the plane of the adhesive bond. Since the shear strength of this bond greatly exceeds the load force to which the barrier may be subjected the tensioning effort of the coiled up part 20 is effectively maintained to its predeterminedly desired degree.

If desired, either one or the other of the overlapped inner end portions of the barrier web may be continued in its length beyond the adhesively bonded overlapped area 17 thereof to provide an unwound section of panelling (not shown) which may be folded back upon itself upon completion of the coiled-up part of the panelling to form a covering strip which is adhesively bonded in place to serve the same purposes as that of the separately secured strip 28 precut to its desired length.

As has been indicated hereinabove, the two-panel bulkheading barrier, tensioned in accord with the present invention, may be employed, as shown in FIG. 9, to close off the open loading doorway 29 of a truck body 30 or the like. As shown, the remote ends of the two panels 11$^a$—11$^a$ forming the bulkhead 13$^a$ are initially adhesively secured respectively to the inside wall surfaces of the truck body to either side of the doorway. Thereafter the freely extending inner ends of the two panels are overlapped and wound into their coiled formation 20$^a$ to tension the bulkhead to the degree desired and the shear strip or blanket 28$^a$ is adhesively applied in shear relation thereto to provide a completed bulkhead having the ability to resiliently absorb and cushion the shock of a shifting load.

Figure 10:
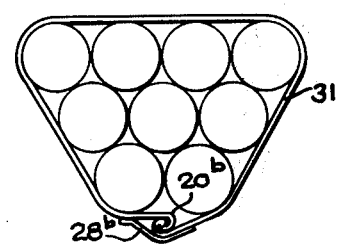
FIG. 10 is a diagrammatic plan view of a pallet-load of individual containers held in unitized formation by the bulk-loading panel material tensioned about the load in accordance with the present invention.

Also, the bulkheading sheet material, because of its inherent stretch capability may be advantageously employed in accord with the present invention as a tensioned means for embracing and holding secure in unitized form for pallet handling a plurality of individual containers or packages of goods as shown in FIG. 10. In such case, a single piece 31 of the sheet material is cut to suitable length to provide end portions which may be adhesively secured together in overlapped relation and then turned to form a tensioning coil 20$^b$ as hereinbefore described, the tensioning integrity of which is maintained by the shear-strip 28$^b$ adhesively secured in overlying relation thereto as shown.

In certain installations of the barrier tensioned in accord with the present invention, where vertical space limitations may make it difficult or even impossible to slip the tensioning tool onto the barrier panelling areas across one or the other of its longitudinally extending edges, such barrier panelling in the region thereof which is to be turned into its coiled tensioning configuration as heretofore described may be reduced in width to provide a substantially narrowed area over which may be fitted a turning tool substantially shorter than the full width-wise dimension of the uncoiled portions of the panelling.

Thus, where the panelling is formed of two panels 11$^c$—11$^c$ having their inner end portions adapted to be adhesively secured together in overlapped relation, as shown in FIG. 11, the inner end portions of said panels may each be longitudinally slitted along transversely spaced parallel lines to respectively provide said panels with tongue-like extensions 32—32 for adhesive securement together in overlapped relation. The portions 33—33 of the slitted panels disposed to either side of each of the tongues 32—32 may be folded back against one or the other surfaces of the panel from which the tongue is formed or they may be removed entirely, as convenience may dictate. The tongues 32—32 are respectively of such lengths that when their free end portions are overlapped and adhesively secured together they provide a narrowed section of panelling in which said adhesively bonded portions are disposed centrally between oppositely extending unbonded portions of the tongues. Upon application of a slotted turning tool 19$^a$ along the vertically extending central line of the bonded region of the tongues 32—32, these tongued parts of the panelling may be conjointly convoluted or wrapped through one or more turns thereof for tensioning the panelling to its desired degree. The narrowed section of the panelling which is approximately one third the full width of the barrier sheet material, and preferably at least twelve inches wide, is most desirably disposed midway between the top and bottom longitudinally extending edges of said sheet material and the lengths of the tongues 32—32 are such that when they are turned to provide the requisite tension the freely disposed vertically extending edge portions 34—34 of the panels 11$^c$—11$^c$ are brought into closely adjoining, preferably abutting, positions. Of course, the tensioned condition of the joined panels 11$^c$—11$^c$ is held secure by applications thereto of a shear strip or blanket as in the previously described installations.

FIGS. 9 and 13 to 15 illustrate employment of the principles of the present invention for tensioning a barrier formed of a single length of the stretchable, high tensile strength sheet material when the same is extended across an open doorway or the like. Such a barrier is shown in FIG. 9 wherein a single length 35 of the stretchable sheet material is adhesively secured at its opposite remote ends, as at 36—36, to the inside surfaces of the side walls of the truck body on either side of the door opening to be spanned by the barrier, the barrier panelling being extended across said opening in its relaxed (i.e., untensioned condition) prior to application of the tensioning tool cross-wise thereof as shown in FIGS. 13 and 15. Upon then turning the tool through one or more turns as illustrated in FIG. 15, the barrier panelling is tensioned to its desired degree, after which the shear strip or blanket 28$^c$ is cemented to the panelling in overlying relation to the turned part thereof to hold the panel 35 in its tensioned condition.

As in the case of the two-piece barrier illustrated in FIG. 11, the single piece barrier 35 may be slit in situ to provide the same with a narrowed region 37 to which the turning tool may be applied for tensioning the barrier. This narrowed region in which the tensioning turns are confined may be obtained by vertically slitting the barrier panelling along longitudinally spaced parallel lines to provide inturned top and bottom flaps 38—38 which may overly the narrowed section or be entirely cut away, as may be desired, to allow use of a turning tool 19$^a$ of short axial length as may be required because of vertical space limitations.

In all instances the desired tension of the panelling is maintained upon adhesive securement of the shear strip or blanket across the tensioning turn or turns and to the portions of the panelling which extend to either side of said tensioned part thereof and it will be understood that while the shear strip is being cemented in place the turns of the coiled part of the panelling may be temporarily held secure in their tensioning condition either by having the outermost turns of said coiled part bonded thereinto as hereinbefore described or by holding secure the ratchet wrench 38 employed for effecting the required rotation of the turning tool.

It will be appreciated that the present invention is subject to various modifications and changes which may be made from time to time without departing from the essential spirit or general principles of the invention, and accordingly it is intended to claim the same broadly as well as specifically as indicated by the appended claims.

What is claimed as new and useful is:

1. A panelling arrangement for use as bulkheads, partitions and like load-retaining structures comprising a flexible panelling assembly formed of stretchable high tensile strength sheet material which is capable when linearly stretched to a degree not exceeding its elastic limit to absorb and resiliently cushion the force of a load embraced thereby, said panel assembly in its relaxed condition being of an overall length which substantially exceeds the expanse of the load face which bears against the panelling to thereby provide the same with oppositely extending side portions adapted to be held in fixed positions relatively to the load, said panelling in the region thereof intermediate said oppositely extending side portions thereof being wound upon itself about an axis extending transversely across the width of the panelling substantially midway between the opposite endwise boundaries of said region whereby to provide said panelling with a self-contained coiled section for tensioning the same to a predetermined degree, and means for securing said panelling in its tensioned condition.

2. A panelling arrangement as defined in claim 1 wherein said last-mentioned means includes a blanket formed of said sheet material adhesively secured in overlying relation across said coiled section of the panelling and flatwise against the tensioned portion of the panelling which extend oppositely beyond either side of said coiled section whereby the load force directed against the tensioned panelling is transmitted primarily as a shear force to the adhesive bond between said blanket and its underlying oppositely extending portions of the panelling.

3. A panelling arrangement as defined in claim 1 wherein said oppositely disposed said portions of said panelling have their outer ends respectively adhesively secured flatwise against the opposite interior side wall surfaces of a truck body or the like in which the load is confined and wherein said intermediate length of said panelling extends transversely across the space between said wall surfaces.

4. A panelling arrangement as defined in claim 1 wherein said oppositely disposed side portions of said panelling have their outer ends respectively adhesively secured flatwise against spaced interior side wall surfaces which define therebetween an open doorway in a side wall of a truck body or the like.

5. A panelling arrangement as defined in claim 1 wherein said oppositely extending side portions of said panelling extend as integral sections thereof which are substantially fixed in position relatively to the load and wherein said panelling in said intermediate region thereof is split to provide the same with a pair of freely extending end sections adhesively secured together in overlapped relation, said overlapped sections being wound about said axis to form at least the innermost convolution of said coiled section of the panelling.

6. A panelling arrangement as defined in claim 5 wherein at least the first of the innermost convolutions of said coiled section are formed of said overlapped end sections of said panelling having only their facing surfaces secured together by an interfacial bond of adhesive.

7. A panelling arrangement as defined in claim 5 wherein portions of said panelling contiguous to and extending beyond said opposite side boundaries of said overlapped portions thereof are wound into said coiled section and adhesively bonded together to form outer convolutions thereof which hold said coiled section intact in its wound-up tensioning condition.

8. A panelling arrangement as defined in claim 5 wherein the outermost surfaces of said overlapped end sections of said panelling are free of any adhesive so that said overlapped sections may be convoluted through at least one full turn without any bonding thereof centrally within an overlying turn of said coiled section.

9. A panelling arrangement as defined in claim 1 wherein the opposite surfaces of said panelling in the intermediate region thereof in which said coiled section is formed is provided with longitudinally spaced adhesively coated areas disposed to either side of a central area having its opposite surfaces free of any adhesive whereby the centrally wound portion of said coiled section is concentrically embraced by an externally wound portion thereof having its convolutions adhesively bound together to inhibit unwinding of said coiled section.

10. A panelling arrangement as defined in claim 1 including removable means for convoluting of said panelling into said coiled section thereof.

11. A panelling arrangement as defined in claim 1 wherein said coiled section of said panelling is provided with at least one full innermost convolution non-adhesively bound thereinto and at least one full outermost convolution so adhesively bound into the coiled section as to effectively resist any unwinding thereof.

12. A panelling arrangement as defined in claim 1 wherein said panelling consists of a pair of panels cut from said sheet material to lengths which conjointly substantially exceed the overall expanse of said load face, said panels having their corresponding remote end portions adhesively secured respectively to spaced side walls of a load-confining compartment and their corresponding inner end portions adhesively secured together in overlapped relation in a region located between the adhesively secured remote ends of said panels, and wherein said self-contained coiled section of said panelling is in the region of and includes the overlapped end portions of said pair of panels.

13. A panelling arrangement as defined in claim 12 wherein portions of said overlapped panels respectively contiguous to said overlapped inner end portions thereof are adhesively coated on at least oppositely facing surfaces thereof and wherein said adhesively coated contiguous portions constitute adhesively bound-in outer convolutions of said coiled section for holding the latter secure against unwinding thereof.

14. In a panelling arrangement as defined in claim 12 wherein said means includes an auxiliary length of said sheet material adhesively bonded to at least one surface of said tensioned panelling in overlying relation to said coiled section thereof and to portions of said panelling which extend to either side of said coiled section whereby the weight or force of a load exerted against said panelling is transmitted primarily as a shear force acting in a plane which is coincident with and parallels that of said adhesive bond.

15. A panelling arrangement as defined in claim 12 wherein the inner end portions of said panels are respectively provided with longitudinally extending tongues each of a transverse width substantially less than that of the sheet material of which the panelling is formed, said tongues having their free ends adhesively secured together in overlapped relation to provide a narrowed section of said panelling which is convoluted into said coiled section.

16. A panelling arrangement as defined in claim 1 wherein said panelling consists of a plastic sheet material composed of high-density polyethylene fibres.

17. A panelling arrangement as defined in claim 1 wherein said coiled section of the panelling is of an axial dimension substantially less than the width of the panelling extending to either side of said coiled section.

18. A panelling arrangement as defined in claim 1 wherein said panelling in the region thereof which is wound to provide said coiled section is of a substantially reduced width.

19. A panelling arrangement for use as bulkheads, partitions and like load-retaining structures comprising a flexible panelling assembly formed of two pieces of stretchable high tensile strength sheet material which are each capable when linearly stretched to a degree not exceeding its elastic limit to absorb and resiliently cushion the force of a load embraced thereby, said two pieces of panel assembly sheet material in their relaxed condition being of a total overall end-to-end length which substantially exceeds the expanse of the load face which bears against the panelling assembly to thereby provide the latter with oppositely extending outer end portions adapted to be held in fixed positions relatively to the load, said two pieces of panelling in the region thereof intermediate said oppositely extending outer end portions thereof having their opposite inner ends overlappable and flatwise adhesively secured to one another after tensioning the same to a predetermined degree, and means for securing said panelling in its tensioned condition.

20. A panelling arrangement as defined in claim 19 wherein said last-mentioned means includes a blanket formed of said sheet material adhesively secured in overlying relation across a junction line of said overlapped inner edges of said panelling and flatwise against the tensioned portions of the panelling which extend oppositely beyond either side of said junction line, whereby the load force directed against the tensioned panelling is transmitted primarily as a shear force to the adhesive bond between said blanket and its underlying oppositely extending portions of the panelling.

21. A panelling arrangement as defined in claim 19 wherein said oppositely disposed side portions of said panelling have their outer ends respectively adhesively secured flatwise against the opposite interior side wall surfaces of a truck body or the like in which the load is confined and wherein said intermediate length of said panelling extends transversely across the space between said wall surfaces.

22. A panelling arrangement as defined in claim 19 wherein said pieces of high tensile strength sheet material consist of plastic sheet material composed of high density polyethylene fibres.

* * * * *